United States Patent
Yang et al.

(10) Patent No.: US 10,193,156 B2
(45) Date of Patent: Jan. 29, 2019

(54) HIGH-DENSITY AND HIGH-HARDNESS GRAPHENE-BASED POROUS CARBON MATERIAL, METHOD FOR MAKING THE SAME, AND APPLICATIONS USING THE SAME

(71) Applicant: Graduate School at Shenzhen, Tsinghua University, Shenzhen (CN)

(72) Inventors: Quan-Hong Yang, Shenzhen (CN); Ying Tao, Shenzhen (CN); Wei Lv, Shenzhen (CN); Bao-Hua Li, Shenzhen (CN); Cong-Hui You, Shenzhen (CN); Chen Zhang, Shenzhen (CN); Fei-Yu Kang, Shenzhen (CN)

(73) Assignee: Graduate School at Shenzhen, Tsinghua University, Shenzhen (CN)

( * ) Notice: Subject to any disclaimer, the term of this patent is extended or adjusted under 35 U.S.C. 154(b) by 980 days.

(21) Appl. No.: 14/370,260

(22) Filed: Jul. 2, 2014

(65) Prior Publication Data

US 2015/0191357 A1 Jul. 9, 2015

Related U.S. Application Data

(63) Continuation of application No. PCT/CN2013/076592, filed on May 31, 2013.

(30) Foreign Application Priority Data

Jul. 23, 2012 (CN) .......................... 2012 1 02551669

(51) Int. Cl.
*C01B 32/30* (2017.01)
*H01M 4/583* (2010.01)
(Continued)

(52) U.S. Cl.
CPC ........... *H01M 4/583* (2013.01); *C01B 32/184* (2017.08); *C01B 32/194* (2017.08); *C01B 32/336* (2017.08); *Y10T 428/13* (2015.01)

(58) Field of Classification Search
CPC . C01B 31/0446; C01B 32/336; C01B 32/184; C01B 32/194; H01M 4/583; Y10T 428/13
See application file for complete search history.

(56) References Cited

U.S. PATENT DOCUMENTS

2006/0151382 A1 7/2006 Petrik
2010/0187484 A1* 7/2010 Worsley ................ B82Y 30/00
252/510

(Continued)

FOREIGN PATENT DOCUMENTS

CN 101993056 3/2011
CN 102730680 10/2012
(Continued)

OTHER PUBLICATIONS

STP—Standard Temperature and Pressure & NTP—Normal Temperature and Pressure, accessed online at: https://www.engineeringtoolbox.com/stp-standard-ntp-normal-air-d_772.html on Mar. 2, 2018 (note definition of SATP).*

(Continued)

*Primary Examiner* — Daniel McCracken
(74) *Attorney, Agent, or Firm* — ScienBiziP, P.C.

(57) ABSTRACT

A method for making graphene-based highly dense but porous carbon material with a high degree of hardness includes forming a sol by dispersing a graphene-based component in a solvent; preparing a graphene-based gel by reacting the sol in a reacting container at a temperature of about 20° C. to about 500° C. for about 0.1 hours to about 100 hours; and drying the gel at a temperature of about 0° C. to about 200° C. to obtain a material. A graphene-based
(Continued)

porous carbon material and applications thereof are also disclosed.

15 Claims, 3 Drawing Sheets

(51) Int. Cl.
  *C01B 32/184* (2017.01)
  *C01B 32/194* (2017.01)
  *C01B 32/336* (2017.01)

(56) References Cited

U.S. PATENT DOCUMENTS

2011/0165321 A1 7/2011 Zhamu et al.
2012/0034442 A1 2/2012 Pauzauskie et al.

FOREIGN PATENT DOCUMENTS

JP 2010-275186 A 12/2010
WO 2012088705 A1 7/2012

OTHER PUBLICATIONS

Name of author: Marcus A. Worsley; Title:Supporting Information to Synthesis of Graphene Aerogel with High Electrical Conductivity; Title of the item:Journal of the American Chemical Society; Date:Oct. 12, 2010; pp. S1-S4.
Synthesis of Graphene Aerogel with High Electrical Conductivity, Worsley Marcus A. et al. J.Am.Chem.Soc. Sep. 2010,vol. 132, pp. 14067-14069.
Marcus A. Worsley et al., Synthesis of Graphene Aerogel with High Electrical Conductivity, J. Am. Chem. Soc, 2010, 132, 14067-14069.

\* cited by examiner

HIGH-DENSITY AND HIGH-HARDNESS GRAPHENE-BASED POROUS CARBON MATERIAL, METHOD FOR MAKING THE SAME, AND APPLICATIONS USING THE SAME

CROSS-REFERENCE TO RELATED APPLICATIONS

This application claims all benefits accruing under 35 U.S.C. § 119 from China Patent Application No. 201210255166.9, filed on Jul. 23, 2012 in the China Intellectual Property Office, the content of which is hereby incorporated by reference. This application is a continuation under 35 U.S.C. § 120 of international patent application PCT/CN2013/076592 filed May 31, 2013.

BACKGROUND

1. Field

The present disclosure belongs to graphene technology and relates to high density and high hardness graphene-based porous carbon materials, methods for making the same, and applications using the same.

2. Background

Graphene is a single atomic layer of graphite, namely a two-dimensional sheet of $sp^2$-bonded carbon atoms which are densely packed in a honeycomb or hexagonal crystal lattice. Graphene has excellent electrical, mechanical, thermal, and optical properties. Since its discovery in 2004, widespread attention and research continues.

Graphene in fact is always close to us. Even in pencil scratch on paper, we can find its presence. However, normally prepared graphene is a powdery material with a low density and a messy accumulation, which causes difficulties for direct utilization. To satisfy the needs for application, a graphene-based material with a certain macroscopic structure has to be made. Just like graphite, graphene is difficult to directly form the macroscopic shape. Certain methods, such as sol-gel method (Marcus A. Worsley et al. Synthesis of Graphene Aerogel with High Electrical Conductivity, J. Am. Chem. Soc., 2010, 132 (40), 14067-14069), hydrothermal method (Yuxi Xu et al., Self-Assembled Graphene Hydrogel via a One-Step Hydrothermal Process, ACS Nano, 2010, 4, 4324-4330), and chemical self-assembly method (Wei Lv et al., One-Pot Self-Assembly of Three-Dimensional Graphene Macroassemblies with Porous Core and Layered Shell, J. Mater. Chem., 2011, 21, 12352-12357), can be adopted to indirectly form a graphene assembly. Yang et al. prepared a graphene-based porous three-dimensional assembly by using a hydrothermal method with an introduction of bonding agent (Chinese patent application number CN 201010568996.8). However, like other aerogel materials, this three-dimensional porous assembly also has a low density and an absence of hardness.

In general, in related art, the first thing for the graphene-based materials is forming a macroform with a special microstructure through interlinkage of graphene sheets together. The shapability and hardness of the assembly do not draw much attention.

What is needed, therefore, is a highly compact graphene assembly with a high-density and high-hardness but retain a high porosity, a method for making the same, and worthwhile applications using the same.

DETAILED DESCRIPTION

One embodiment of a method for making graphene-based porous carbon material includes steps of:

S1, forming a sol by dispersing a graphene-based component in a solvent;

S2, preparing a graphene-based gel by reacting the sol in a reacting container at a temperature of about 20° C. to about 500° C. for about 0.1 hours to about 100 hours; and S3, drying the graphene-based gel at a temperature of about 0° C. to about 200° C. to obtain the graphene-based porous carbon material.

The graphene-based component can be at least one of graphite, graphite oxide, graphene oxide, and graphene.

In step S1, an auxiliary component can be added and dispersed in the solvent to accompany the graphene-based component to form the sol.

The auxiliary component is a carbon source and can be at least one of carbon nanotube, carbon black, graphite, polyvinyl alcohol (PVA), sucrose, and glucose. A weight percentage of the auxiliary component in the total weight of the auxiliary component and the graphene-based component can be less than 98%, and in one embodiment is less than 30%. The using of at least one of carbon nanotube, carbon black, and graphite as the auxiliary component renders the achieved graphene-based porous carbon material a better conductive network and with superior electrical and thermal conductivities. The using of at least one of polyvinyl alcohol (PVA), sucrose, and glucose as the auxiliary component can enhance a bridging effect between the graphene-based components and greatly increase the density and hardness of the achieved graphene-based porous carbon material. Depending on the individual carbon sources, the prepared graphene-based porous carbon material can have characteristics of both soft carbon and hard carbon, which facilitates the applications in the field of energy storage. Because of the great differences in the densities and volumes of the auxiliary component and the graphene-based component, and also because of the different forms and different weight losses between the auxiliary component and the graphene-based component during the hydrothermal/solvothermal reaction, the high-density and high-hardness porous carbon material with the basic structure unit of graphene can be formed in one step even when the weight percentage of the auxiliary component in the total weight of the auxiliary component and the graphene-based component is 98%. In one embodiment, considering the dispersibility of the auxiliary component, the weight percentage of the auxiliary component is less than 30%.

In step S1, the solvent can be at least one of water, ethanol, methanol, dimethyl formamide, ethylene glycol, and methyl pyrrolidone. The step dispersing the graphene-based component in the solvent can include at least one step of mechanical stirring, magnetic stirring, ultrasonic dispersing, milled dispersing, and high energy treatment.

In step S2, a pH value of the sol prepared in step S1 can be adjusted to 8 or less, to optimize the preparation conditions for reducing the critical reaction temperature and reaction time for preparing the graphene-based gel. Thus, the energy consumption of the preparation process greatly decreases, and the safety hazards in mass production are reduced.

In step S2, the sol is heated by at least one method of electric heating, microwave heating, infrared heating, and induction heating. In one embodiment, the sol is heated to and kept at a temperature of about 100° C. to about 200° C. for about 1 hour to about 20 hours. The reacting container can be a hydrothermal/solvothermal reacting container or a regular normal pressure container. That is, the sol can be heated in high or normal pressures.

In step S3, the graphene-based gel is dried at a relatively high temperature (i.e., about 0° C. to about 200° C.) compared to a freeze-drying step (below 0° C.). The liquid solvent (e.g., water) can be evaporated from the graphene-based gel directly. During the evaporating of the liquid solvent, the graphene sheets in the graphene-based gel experience a self-assembly procedure. More specifically, as the liquid solvent leaves from the graphene, the surface tension force that existed between the liquid solvent and graphene can draw/pull the plurality of graphene sheets closer to each other. Thus, the original pores defined by the graphene sheets in the graphene-based gel decrease in size, and the graphene assembly is made more dense. However, even though they are closer, the graphene sheets do not have an increase in the contact area between each other or only have a very small increase in the contact area between each other, because the graphene sheets tend to be more curved under the action of the surface tension during the evaporating of the liquid solvent. As a result, though the pore size is decreased, the effective surface area (i.e., the surface of the graphene sheets that is not contacted by other graphene sheets or other auxiliary component, thus can be counted into the specific surface area) is not decreased or only has a very small decrease. Therefore, the graphene-based porous carbon material having not only a high density but also a high specific surface area is self assembled by step S3.

In one embodiment, after step S3, the method also includes a step S4 of heating the graphene assembly obtained in the step S3 in an oxygen-deficient atmosphere and a temperature of about 100° C. to about 3600° C. for about 0.1 hours to about 100 hours.

In another embodiment, after step S3, the method also includes a step S4' of activating the graphene assembly obtained in step S3 at a temperature of about 200° C. to about 2000° C. for about 0.1 hours to about 50 hours.

In yet another embodiment, after step S3, steps S4 and S4' are both processed.

In step S4, the oxygen deficient atmosphere can be achieved by vacuum pumping the reacting container and/or introducing at least one of an inert gas and a reductive gas to the reacting container. The inert gas can be at least one of nitrogen gas, argon gas, and helium gas. The reductive gas can be at least one of ammonia gas, hydrogen gas, and carbon monoxide (CO) gas. In one embodiment, the material obtained in the step S3 is heated at the temperature of about 300° C. to about 2400° C. for about 2 hours to about 10 hours.

In step S4', the activating can be at least one of chemical activation and physical activation. The chemical activating can be at least one of liquid phase activation and solid phase activation. In one embodiment, the temperature for the activating can be in a range from about 600° C. to about 900° C., and the time period for the activation can be in a range from about 0.5 hours to about 8 hours.

One embodiment of a graphene-based porous carbon material made from the method described above is also disclosed. Compared to the conventional graphene-based material, the graphene-based porous carbon material of the present disclosure has a high density, a high hardness, and a high specific surface area. In the graphene-based porous carbon material, graphene is a basic unit, and the graphene-based porous carbon material is composed of the plurality of graphene sheets joined and bonded with each other to form a network structure. The graphene-based porous carbon material has a density of about 0.3 g/cm$^3$ to about 4.0 g/cm$^3$, a hardness (H) of about 0.01 GPa to about 6.0 GPa, a specific surface area of about 5 m$^2$/g to about 3000 m$^2$/g, and a pore volume of about 0.1 cm$^3$/g to about 2.0 cm$^3$/g. The more acidic the pH value of the sol, the more compact is the graphene-based gel, and the greater is the density of the graphene-based porous carbon material. Also, the higher the drying temperature in step S3, the greater will be the density and hardness of the graphene-based porous carbon material. As the heating temperature increases, the hardness of the graphene-based porous carbon material reduces first and then increases. The reason is that, at a lower temperature, the material experiences a functional group loss, during which the porous structure develops and the specific surface area increases, accompanying a certain degree of harness loss. And at a higher temperature stage, the material shrinks to increase the hardness, and forms a certain amount of closed pores, which cannot be included in the calculation of the effective specific surface area, to decrease the specific surface area. The closed pores can be further opened by step S4' of the activating reaction, which can also make additional pores. The achieved graphene-based porous carbon material can be free of binder.

In one embodiment, the thickness of the pore wall of the graphene-based porous carbon material can be in a range from about 0.335 nm to about 3,350 nm.

In one embodiment, the density of the graphene-based porous carbon material can be in a range from about 0.8 g/cm$^3$ to about 2.2 g/cm$^3$.

In one embodiment, the hardness of the graphene-based porous carbon material can be in a range from about 0.05 GPa to about 3.0 GPa, and an elastic module (E) can be in a range from about 0.5 GPa to about 40 GPa.

When the specific surface area of the graphene-based porous carbon material is in a range from about 800 m$^2$/g to about 3000 m$^2$/g, the density of the graphene-based porous carbon material can be in a range from about 0.3 g/cm$^3$ to about 1.5 g/cm$^3$, and the graphene-based porous carbon material does not tend to be powdery.

In one embodiment, an average size of the pore of the graphene-based porous carbon material is in a range from about 0.5 nm to about 600 nm.

Regarding suitable applications for the disclosure, the present disclosure also discloses an adsorption material including the above described graphene-based porous carbon material.

The present disclosure also discloses a filler of a chromatographic column, the filler includes the above described graphene-based porous carbon material.

The present disclosure also discloses a porous container including the above described graphene-based porous carbon material.

The present disclosure also discloses an electrode material of a lithium ion battery and a supercapacitor, the electrode material includes the above described graphene-based porous carbon material.

The present disclosure also discloses an electrode material having a high volumetric energy density, and the electrode material includes the above described graphene-based porous carbon material.

The present disclosure also discloses a catalyst carrier including the above described graphene-based porous carbon material.

The present disclosure also discloses a thermal conducting material including the above described graphene-based porous carbon material.

The present disclosure makes certain advances in the field. The present method makes the graphene sheets, bonded with each other and self assembled, to form the graphene-based porous carbon material in a macroscopic shape without adding any binder. The macroscopic shape of the graphene-based gel is solidified during the drying step S3, to form the high-density, high-hardness, uniform, thermally conductive, high-specific-surface-area, pore-rich graphene-based porous carbon material.

The present method includes the preparing step S2 of the graphene-based gel, and the presence of this step makes it possible to use an impregnation method, to simply and efficiently load a catalyst, to increase the doping range and uniformity of the catalyst.

The graphene-based porous carbon material formed by the present method not only has a predetermined macroscopic shape without adding any binder but also has the considerable hardness and the extremely high specific surface area (e.g., from about 800 $m^2/g$ to about 3000 $m^2/g$). The formed graphene-based porous carbon material has a stable macroscopic shape and does not tend to be powdery, which provides better convenience for the applications in adsorption, catalysis, and energy storage fields.

The graphene-based porous carbon material formed by the present method is hard and wear-resistant; conductive in itself and requiring no additional conductive agent; high-shapability by using molds or cutting steps to prepare a variety of desired shapes; pore-rich so that is an ideal acceptor for various fillers such as metal oxide nanoparticles, metal nanoparticles (e.g., Co, Au, Ag, Pt, Ru et al., and alloys thereof), polymers, proteins, amino acids, and enzyme biomolecules. The graphene-based porous carbon material has a high porosity, and not only has a significant number of micropores, but also has a suitable amount of pores with a larger size, preferable for ion transportation.

The step S4 of heating of the material obtained in step S3 and/or the step S4' of activating of the material obtained in step S3, in particular heating at the temperature of about 300° C. to about 2400° C. and activating at the temperature of about 600° C. to about 900° C., and more specifically, heating and activating below 850° C., can further adjust the porosity and hardness of the graphene-based porous carbon material. The heating of S4 and activating of S4' below 850° C. can further increase the porosity and the specific surface area, with a slightly reduction of hardness. Above 850° C., the graphene sheets further curves and shrinks to increase the hardness, however, due to the forming of closed pores, the specific surface area decreases.

By using the present method, the hardness of the graphene-based porous carbon material is larger than 0.01 GPa and can reach 6.0 GPa, and the specific surface area of the graphene-based porous carbon material is larger than 5 $m^2/g$ and can reach 3000 $m^2/g$.

In comparison, the conventional graphene-based porous carbon materials having the same porosity always have a low density and insignificant hardness, and need an additional binder to form a desired macroscopic shape.

In the original sol of step S1 with an acidic pH value, stronger forces exist between the graphene layers/sheets, thus a more compact graphene-based gel is assembled. Also because of the stronger forces between graphene layers/sheets, the pressure requirement of the reacting container for preparing the graphene-based gel decreases, thereby widening the material selection scope of the reacting container, and also reducing the critical reacting time in the reacting container. Thus, the energy consumption and safety risks during industrial production are significantly reduced.

Because of its extensive porosity and good mechanical strength, the graphene-based porous carbon material can be used as a porous container, filled with various fillers and also play a role in the adsorption of heavy metal ions, dyes, toxic chemicals, oil, etc., meanwhile it is a good choice for the filler of the chromatographic column. The graphene-based porous carbon material can have a good performance in heavy metal ion detection, and can be used as a thermal conductivity material due to the excellent thermal conductivity thereof. As an electrode material for lithium ion batteries and super capacitors, the graphene-based porous carbon material has an outstanding specific volume capacity. During the preparation of the graphene-based porous carbon material, a catalyst precursor can be additionally added to the sol, which easily achieves uniform catalyst loading, and effectively improves the uniformity and the doping range. As a catalyst carrier, the graphene-based porous carbon material may be used in fixed bed reactors, fluidized bed reactors, fuel cells, and so on.

EXAMPLE 1

85 mL of deionized water is added to 170 mg of graphite oxide powder made by Hummer method and ultrasonically dispersed at a power of about 200 W for about 2 hours to achieve a graphene oxide sol. A pH value of the graphene oxide sol is adjusted to about 3. Then the graphene oxide sol is sealed in a hydrothermal reacting container. A volume of the container is 100 mL. The hydrothermal reacting container is heated in a muffle furnace at about 150° C. for about 6 hours. After the hydrothermal reacting container is cooled, the formed graphene-based gel, which is a smooth cylindrical shaped material having the same shape with the inner space of the container, is taken out from the container and dried at about 1° C. After that, the cylindrical shaped graphene-based gel is heated to about 700° C. with a temperature increasing at a rate of about 5° C./min in argon atmosphere and kept at that temperature for about 5 hours, to achieve the high density and high hardness graphene-based porous carbon material. The graphene-based porous carbon material has a specific surface area per unit gram of about 750 $m^2/g$, a specific surface area per unit volume of about 960 $m^2/cm^3$, a hardness of about 0.78 GPa, and an elastic modulus of about 4.36 GPa.

EXAMPLE 2

85 mL of deionized water is added to 510 mg of graphite oxide powder made by Hummer method and ultrasonically dispersed at a power of about 200 W for about 2 hours to achieve a graphene oxide sol. A pH value of the graphene oxide sol is adjusted to about 8. Then the graphene oxide sol is sealed in a reacting container. A volume of the container is 100 mL. The reacting container is heated at about 500° C. for about 3 hours. After the reacting container is cooled, the formed graphene-based gel, which is a smooth cylindrical shaped material, is taken out from the container. The cylindrical shaped graphene-based gel is cut into thin pieces with a thickness of about 1 millimeter to about 5 millimeters and dried at room temperature. After that, the pieces of graphene-based gel are heated to 3600° C. with a temperature increasing at a rate of about 5° C./min in argon atmosphere and kept at that temperature for about 2 hours, to achieve the high density and high hardness graphene-based porous carbon material. The graphene-based porous carbon material has a density of about 0.34 g/cm$^3$, a specific surface area per unit gram of about 750 m$^2$/g, and a hardness of about 1.68 GPa.

EXAMPLE 3

85 mL of dimethyl formamide is added to a mixture of 170 mg of graphite oxide powder made by Hummer method and 17 mg of carbon nanotubes, and ultrasonically dispersed at a power of about 200 W for about 3 hours to achieve a sol. A pH value of the graphene oxide sol is adjusted to about 3. Then the graphene oxide sol is sealed in a hydrothermal reacting container. A volume of the container is 100 mL. The hydrothermal reacting container is heated in a muffle furnace at about 150° C. for about 10 hours. After the hydrothermal reacting container is cooled, the formed graphene-based gel is taken out from the container and dried at room temperature to form the graphene-based porous carbon material. After that, the graphene-based gel is placed in 3 mol/L of KOH solution for about 24 hours to chemically activate the graphene-based gel and dried for about 24 hours. Then, the activated graphene-based porous carbon material is heated to about 900° C. with a temperature increasing at a rate of about 10° C./min in argon atmosphere and kept at that temperature for about 0.1 hours, to achieve the high density and high hardness graphene-based porous carbon material with a specific surface area per unit gram of about 2980 m$^2$/g.

EXAMPLE 4

85 mL of deionized water is added to a mixture of 170 mg of graphite oxide powder made by Hummer method and 8.729 g of sucrose, and ultrasonically dispersed at a power of 200 W for 2 hours to achieve a graphene oxide sol. A pH value of the graphene oxide sol is adjusted to about 3. Then the graphene oxide sol is sealed in a high pressure reacting container. The high pressure reacting container is heated in a muffle furnace at about 180° C. for about 3 hours. After the high pressure reacting container is cooled, the formed smooth graphene-based gel is taken out from the container and dried at 200° C. to form the graphene-based porous carbon material. The graphene-based porous carbon material has a plurality of graphene sheets joined with each other and a plurality of carbon spheres decorated therebetween, the carbon spheres are formed from sucrose. The graphene-based porous carbon material has a density of about 2.76 g/cm$^3$, and a hardness of about 5.93 GPa. A percentage of the graphene in the graphene-based porous carbon material is about 10%.

EXAMPLE 5

Figure 1:
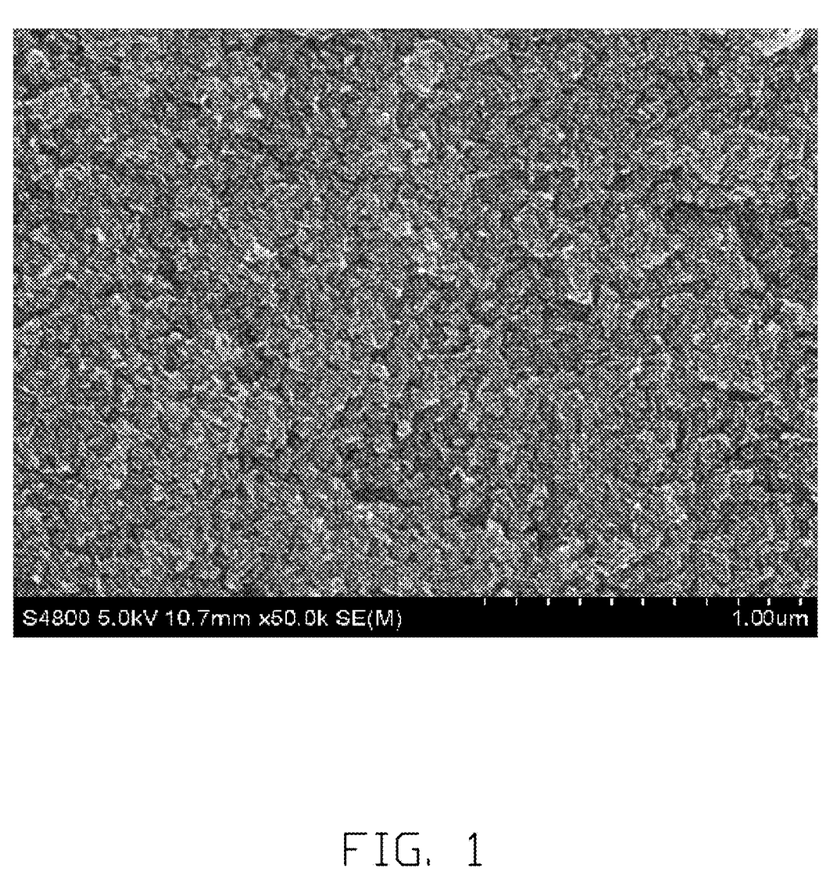
FIG. 1 shows a scanning electron microscope (SEM) image of one embodiment of a high-density and high-hardness graphene-based porous carbon material.
Figure 2:
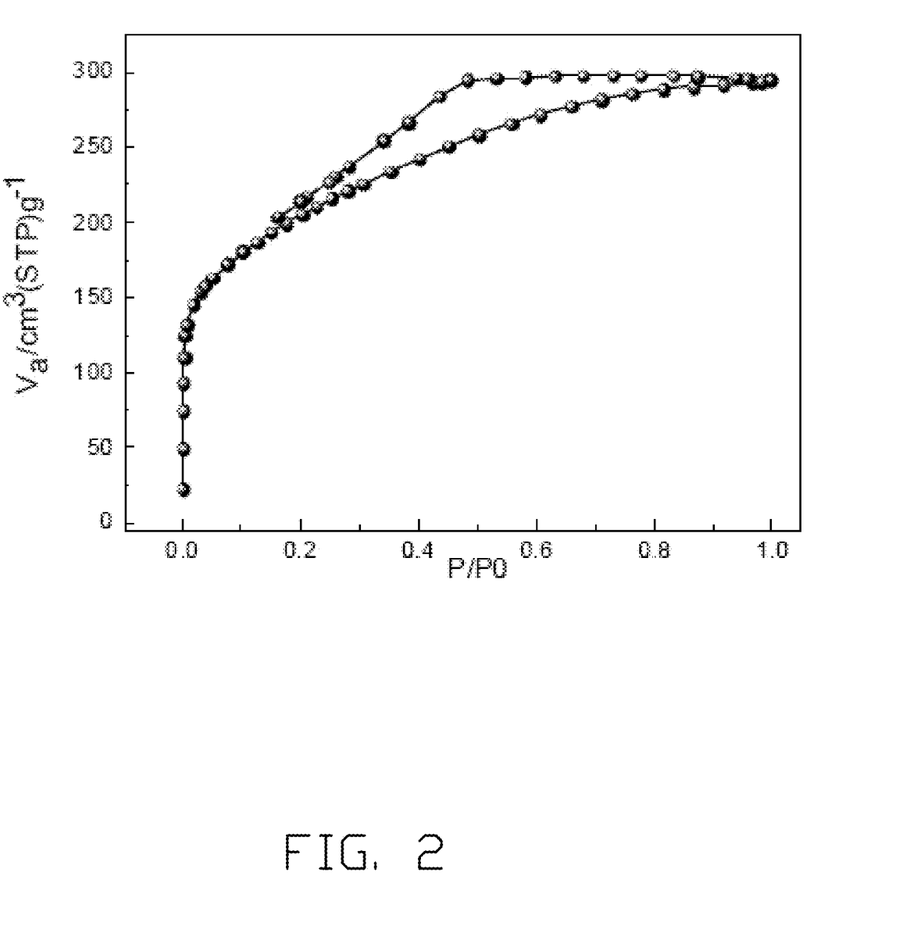
FIG. 2 shows a SEM image of another embodiment of the high-density and high-hardness graphene-based porous carbon material.
Figure 3:
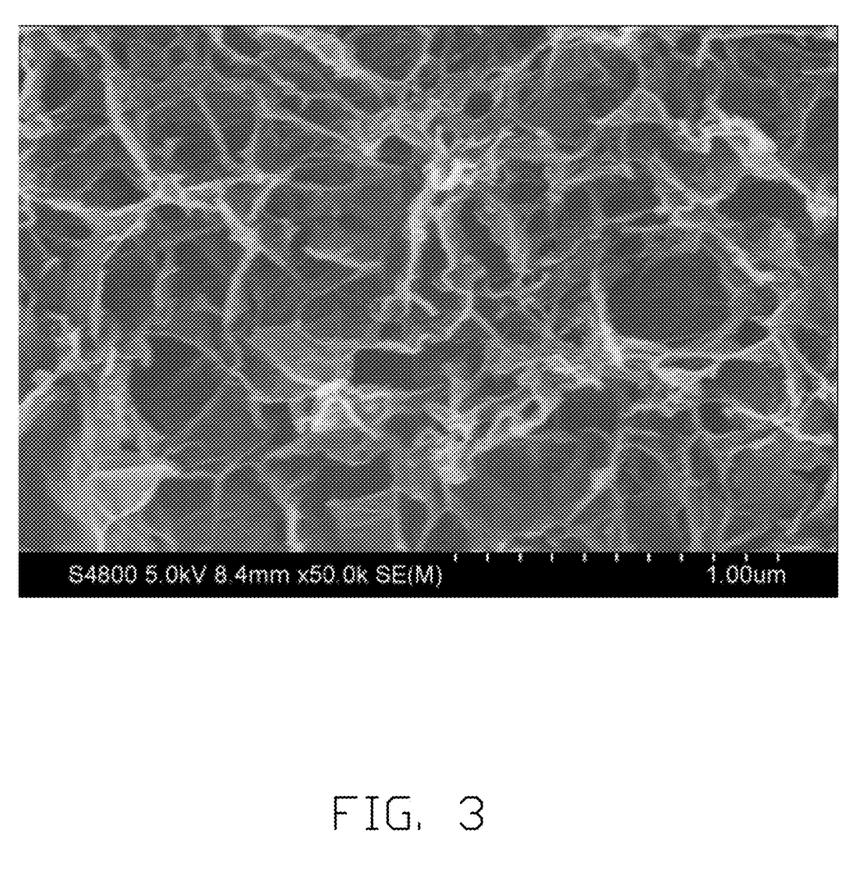
FIG. 3 shows a nitrogen gas adsorption-desorption curve of one embodiment of the high-density and high-hardness graphene-based porous carbon material.

6 mL of polyvinyl alcohol with a concentration of about 20 mg/mL is added to 1800 mL of liquid filtrate obtained during the forming of graphene oxide by using the Hummer method to form a liquid mixture. The liquid mixture is centrifuged at 3800 rpm for about 20 minutes. 85 g of the bottom material after the centrifuge is collected and sealed in a hydrothermal reacting container. A volume of the container is 100 mL. The hydrothermal reacting container is heated in a muffle furnace at about 150° C. for about 6 hours. After the hydrothermal reacting container is cooled, the formed graphene-based gel is taken out from the container and dried at about 110° C. for about 20 hours to achieve the graphene-based porous carbon material. Then the graphene-based gel is heated to 800° C. with a temperature increasing at a rate of about 5° C./min in argon atmosphere and kept at that temperature for about 6 hours, to achieve the high-density and high-hardness graphene-based porous carbon material. Referring to FIG. 2, the graphene-based porous carbon material has a network structure formed by overlapped and joined graphene sheets.

EXAMPLE 6

6 mg/mL of uniform graphene oxide sol formed by ultrasonic dispersing is obtained. A pH value of the graphene oxide sol is adjusted to about 3.80 mL of the pH value adjusted graphene oxide sol is put into a screw shaped glass cuvette and sealed in a hydrothermal reacting container. A volume of the container is 100 mL. The hydrothermal reacting container is heated in a muffle furnace at about 120° C. for about 20 hours. After the hydrothermal reacting container is cooled, the formed screw shaped graphene-based gel is taken out from the container and dried at 110° C. for about 10 hours. Then the graphene-based porous carbon material is heated to 800° C. with a temperature increasing at a rate of about 5° C./min in argon atmosphere and kept at that temperature for about 6 hours, to achieve the high-density and high-hardness screw shaped graphene-based porous carbon material.

EXAMPLE 7

85 mL of deionized water is added to 170 mg of graphite oxide powder made by Hummer method and ultrasonically dispersed at a power of about 200 W for about 2 hours to achieve a graphene oxide sol. A pH value of the graphene oxide sol is adjusted to about 3. Then the graphene oxide sol is sealed in a 100 mL hydrothermal reacting container. The hydrothermal reacting container is heated in a muffle furnace at about 150° C. for about 6 hours. After the hydrothermal reacting container is cooled, the formed graphene-based gel, which is a smooth cylindrical shaped material, is taken out from the container. The cylindrical shaped graphene-based gel is dried at room temperature, and then heated to 850° C. with a temperature increasing at a rate of about 5° C./min in argon atmosphere and kept at that temperature for about 10 minutes. Then, an activating step is applied by introducing a mixture of water vapor and nitrogen gas (a percentage of the water vapor in the mixture is about 20%) for about 40 minutes, to achieve the high density and high hardness graphene-based porous carbon material. The graphene-based porous carbon material has a density of about 0.83 g/cm$^3$, a specific surface area per unit gram of about 1600 m$^2$/g, and a hardness of about 0.03 GPa.

EXAMPLE 8

85 mL of deionized water is added to 170 mg of graphite oxide powder made by Hummer method and ultrasonically dispersed at a power of about 200 W for about 2 hours to achieve a graphene oxide sol. A pH value of the graphene oxide sol is adjusted to about 1. Then the graphene oxide sol is sealed in a hydrothermal reacting container. A volume of the container is 100 mL. The reacting container is heated in a muffle furnace at about 50° C. for about 3 hours. After the hydrothermal reacting container is cooled, the formed graphene-based gel, which is a smooth cylindrical shaped material, is taken out from the container. The cylindrical shaped graphene-based gel is dried at room temperature to form the graphene-based porous carbon material. As a result of the pH value of the graphene oxide sol being adjusted to about 1, the temperature and time for the hydrothermal reaction are both greatly reduced.

EXAMPLE 9

88 mL of deionized water is added to 176 mg of graphite oxide powder made by Hummer method and ultrasonically dispersed at a power of about 200 W for about 2 hours to achieve a graphene oxide sol. A pH value of the graphene oxide sol is adjusted to about 11. Then the graphene oxide sol is sealed in a hydrothermal reacting container. A volume of the container is 100 mL. The reacting container is heated in a muffle furnace at about 200° C. for about 100 hours. After the hydrothermal reacting container is cooled, the formed graphene-based gel, which is a smooth cylindrical shaped material, is taken out from the container. The cylindrical shaped graphene-based gel is dried at room temperature.

EXAMPLE 11

The steps and conditions in this example are the same as those of Example 7, except that the mixture of water vapor and nitrogen gas is introduced at a temperature of about 2000° C. The high density and high hardness graphene-based porous carbon material is achieved.

EXAMPLE 12

The steps and conditions in this example are the same as those of Example 2, except that the graphene-based gel is cut into tetrahedrons and dried at room temperature. The high-density and high-hardness graphene-based porous carbon tetrahedrons are achieved. By using the same method, square and cuboid shaped high density and high hardness graphene-based porous carbon material can also formed.

EXAMPLE 13

The steps and conditions in this example are the same as those of Example 7, except that the mixture of water vapor and nitrogen gas is introduced at a temperature of about 200° C. The high density and high hardness graphene-based porous carbon material is achieved.

EXAMPLE 14

The steps and conditions in this example are the same as those of Example 8, except that the graphene-based gel is placed in a 5 wt % of amino acid solution for about 10 hours before the drying step to allow the amino acid to infill. The amino acid filled high-density and high-hardness graphene-based porous carbon material with a filling percentage of about 37% is achieved.

EXAMPLE 15

The high density and high hardness graphene-based porous carbon material obtained in Example 2 is used as an anode active material of a lithium ion battery. The graphene-based porous carbon material is milled into powder and mixed with PTFE (60 wt %) in a ratio of 90:10 in N-Methylpyrrolidone (NMP) and ultrasonically dispersed for 30 minutes to form a slurry. The slurry is coated on copper foil, heated for about 12 hours at about 120° C., and cut into 1 $cm^2$ pieces. The lithium ion battery is assembled in an Argon atmosphere glove box using the formed piece as a cathode electrode and a lithium metal foil as an anode electrode. The electrolyte solution is 1 mol/L $LiPF_6$ in a mixture of EC, DC, and EMC in 1:1:1 of volume ratio. The separator is made of polyethylene. A CR2032-type coin cell is assembled. A volume specific capacity of the lithium ion battery is about 910 $mAh/cm^3$.

EXAMPLE 16

A catalyst carrier using the graphene-based porous carbon material is provided. The steps and conditions in this example are the same as those of Example 1, except that the graphene-based gel is placed in a 28 wt % of $PdCl_2$ solution for about 24 hours before the drying step. The high-hardness, shaped as required, and uniformly-loaded Pd catalyst is formed. Using the Pd catalyst in a heck reaction, a selectivity is about 96% and a yielding is near to 100%.

EXAMPLE 17

The high-density and high-hardness graphene-based porous carbon material obtained in Example 8 is used as a thermally-conductive material. The thin pieces are mounted below a heat generating device as heat dissipation fins. A thermal conductivity of the heat dissipation fins is about 800 W/(m·K).

EXAMPLE 18

The high-density and high-hardness graphene-based porous carbon material obtained in Example 8 is used as an electrode material of a supercapacitor. The graphene-based porous carbon material is milled into powder and mixed with PTFE (60 wt %) in a weight ratio of 90:10 in ethanol and ultrasonically dispersed for 30 minutes to form a slurry. The slurry is coated on nickel foam foils, heated overnight at about 70° C., and placed into alkaline electrolyte for about 12 hours to form the electrodes. The volume specific capacity of the supercapacitor using the electrodes is about 368 $F/cm^3$.

The above-described contents are detailed illustrations with specific and preferred embodiments for the present invention. It cannot be considered that the implementation of the present invention is limited to these illustrations. For one of ordinary skill in the art, variations and equivalents having the same effects and applications can be made without departing from the spirit of the present invention and should be seen as being belonged to the scope of the present invention.

What is claimed is:

1. A method for making graphene-based porous carbon material comprising steps of:
   forming a sol by dispersing a graphene-based component and an auxiliary component in a solvent, the auxiliary component selected from the group consisting of polyvinyl alcohol, sucrose, glucose, and combinations thereof;
   adjusting a pH value of the sol to 8 or less;

preparing a graphene-based gel by reacting the sol in a reacting container at a temperature of about 20° C. to about 500° C. for about 0.1 hours to 100 hours; and evaporative drying the graphene-based gel at a temperature of about 0° C. to about 200° C. to obtain the graphene-based porous carbon material.

2. The method of claim 1 further comprising heating the graphene-based porous carbon material in an oxygen deficient atmosphere and at a temperature of about 100° C. to about 3600° C. for about 0.1 hours to about 100 hours.

3. The method of claim 2, further comprising creating the oxygen deficient atmosphere by vacuum pumping the reacting container and/or introducing at least one of inert gas and reductive gas to the reacting container.

4. The method of claim 1 further comprising heating the graphene-based porous carbon material in an oxygen deficient atmosphere and at a temperature of about 300° C. to about 2400° C. for about 2 hours to about 10 hours.

5. The method of claim 1 further comprising activating the graphene-based porous carbon material at a temperature of about 200° C. to about 2000° C. for about 0.1 hours to about 50 hours.

6. The method of claim 5, wherein the graphene-based porous carbon material is activated by at least one of chemical activating and physical activating, the chemical activating comprising at least one of liquid phase activating and solid phase activating.

7. The method of claim 6, wherein a temperature for the activating is in a range from about 600° C. to about 900° C., and the time period for the activating is in a range from about 0.5 hours to about 8 hours.

8. The method of claim 1, wherein the graphene-based component is selected from the group consisting of graphite, graphite oxide, graphene oxide, graphene, and combinations thereof.

9. The method of claim 1, wherein the solvent is selected from the group consisting of water, ethanol, methanol, dimethyl formamide, ethylene glycol, methyl pyrrolidone, and combinations thereof.

10. The method of claim 1, wherein the graphene-based component is dispersed in the solvent by at least one of mechanical stirring; magnetic stirring; ultrasonic dispersing; milled dispersing; and high energy treatment.

11. The method of claim 1, wherein the sol is heated by at least one of electric heating; microwave heating; infrared heating; and induction heating.

12. The method of claim 1, wherein the sol is heated at a temperature of about 100° C. to about 200° C. for about 1 hour to about 20 hours.

13. The method of claim 1, wherein a weight percentage of the auxiliary component in a total weight of the auxiliary component and the graphene-based component is less than 98%.

14. The method of claim 13, wherein the weight percentage of the auxiliary component in the total weight of the auxiliary component and the graphene-based component is less than 30%.

15. The method of claim 1, wherein the pH value of the sol is adjusted to 3.

* * * * *